United States Patent

McCurley et al.

[11] Patent Number: 6,057,682
[45] Date of Patent: May 2, 2000

[54] DUAL ROTATIONAL AND LINEAR POSITION SENSOR

[75] Inventors: Jeffrey L. McCurley, White Pigeon, Mich.; James E. White, Warsaw, Ind.; Craig A. Jarrard, Middlebury, Ind.; Ronald C. Nonnenmacher; John Zdanys, Jr., both of Elkhart, Ind.; Thomas R. Olson, Chesterton, Ind.; Bret W. Shriver, Tinley Park, Ill.

[73] Assignee: CTS Corporation, Elkhart, Ind.

[21] Appl. No.: 09/062,408

[22] Filed: Apr. 17, 1998

[51] Int. Cl.[7] .................. G01B 7/14; G01B 7/30; H01H 36/00
[52] U.S. Cl. .................. 324/207.23; 324/207.2; 324/207.22; 200/61.88; 74/473.12
[58] Field of Search .................. 324/207.2–207.25; 73/DIG. 3; 74/473.1, 473.12, 471 XY, 335; 200/6 A, 61.88

[56] References Cited

U.S. PATENT DOCUMENTS

| | | | |
|---|---|---|---|
| 4,789,826 | 12/1988 | Willett | 324/207.2 |
| 5,142,225 | 8/1992 | Gerlach et al. | 324/207.23 X |
| 5,198,763 | 3/1993 | Konishi | 324/207.23 |
| 5,365,791 | 11/1994 | Padula et al. | 73/DIG. 3 X |
| 5,789,915 | 8/1998 | Ingraham | 324/207.2 |
| 5,955,881 | 9/1999 | White et al. | 324/207.2 |

FOREIGN PATENT DOCUMENTS

| | | | |
|---|---|---|---|
| 1037055 | 8/1983 | U.S.S.R. | 324/207.23 |
| 1679177 | 9/1991 | U.S.S.R. | 324/207.23 |

*Primary Examiner*—Gerard Strecker
*Attorney, Agent, or Firm*—Mark P. Bourgeois

[57] ABSTRACT

A dual positional hall effect sensor 10 having an outer housing 12, an actuator 14, a linear movement sensor 20, and a rotational movement sensor device 22. The housing 12 includes a lower chamber 24 and an upper chamber 26, with a barrier wall 28 separating therebetween. The actuator 14 is made up of a coupling 32 for coupling to a movable device (not shown) that is to have its position sensed, a rod 34 that extends from the lower to the upper chamber, a collar 36 for retaining the actuator 14 within the lower chamber, and a key 38. The linear motion sensor 20 is unattachably positioned to set on collar 36, and includes a magnetically conducting pole piece 42 and a left and right magnets 44. The magnets 44 and pole piece 42 are positioned around the rod 34 in a "U" shaped configuration. The lower chamber 24 also includes a positionally fixed hall effect sensor 46 and a spring 48 positioned between the barrier wall 28 and the collar 36. The rotational movement sensor 22, located in the upper chamber 26, includes a sensor housing structure 52 that has a groove or slide 54 for insertion and sliding of the key 38. The sensor 22 further includes a magnetically conducting pole piece 56 and a top and bottom magnet 58. A hall sensor 60 is positioned between the two parts of the magnet 58 and fixed in position relative to any rotational movement of the rotational sensor 22.

7 Claims, 4 Drawing Sheets

DUAL ROTATIONAL AND LINEAR POSITION SENSOR

BACKGROUND OF THE INVENTION

1. Technical Field of the Invention

This invention relates to a position hall effect sensor for determining both rotational and linear position changes.

2. Background Art

In recent years, many designers of positional sensing equipment have been designing a new breed of sensors based upon the general theories of magnetics. For example, the automotive industry has been in the process of converting the control system of the standard internal combustion engine to a system that can be controlled by a computer that received input signals from mechanical and electrical systems using hall effect positional sensors.

Examples of patents related to the present invention are as follows, and each patent is herein incorporated by reference for supporting teachings:

U.S. Pat. No. 5,365,791, is a signal generator for generating an electrical signal that varies according to movement of an actuating member includes a plunger slidable mounted within a housing that carries a pair of permanent magnets for generating a magnetic field to be applied to a hall effect generator.

U.S. Pat. No. 4,958,615, is a signal generator that has a hall effect sensor and a magnet disposed inside a distributor housing.

U.S. Pat. No. 4,928,089, is an encoder for a wheel that uses a linear hall effect sensor and magnet mounted on a non-ferrous metal shaft.

U.S. Pat. No. 4,703,261, is a measuring system for a gear measuring feeler that has a hall effect sensor elements arranged in opposing relationship to each other in the magnetic field.

The foregoing patents reflect the state of the art of which the applicant is aware and are tendered with the view toward discharging applicant's acknowledged duty of candor in disclosing information that may be pertinent in the examination of this application. It is respectfully stipulated, however, that none of these patents teach or render obvious, singly or when considered in combination, applicant's claimed invention.

DISCLOSURE OF THE PREFERRED EMBODIMENT

It is a feature of the invention to provide a position hall effect sensor for determining both rotational and linear position changes.

An additional feature of the invention is to provide two hall effect sensors, where the first senses any axial rotation, and the second senses any positional changes along the length of the axis or linear motion.

The invention resides not in any one of these features per se, but rather in the particular combination of all of them herein disclosed and claimed, and it is distinguished from the prior art in this combination of all of its structures for the functions specified.

There has thus been outlined, rather broadly, the more important features of the invention so the detailed description thereof that follows may be better understood, and so the present contribution to the art may be better appreciated. There are, of course, additional features of the invention that will be described hereinafter and which will form the subject matter of the claims appended hereto.

Other features of the present invention will become more clear from the following detailed description of the invention, taken with the accompanying drawings and claims, or may be learned by the practice of the invention.

Figure 1:
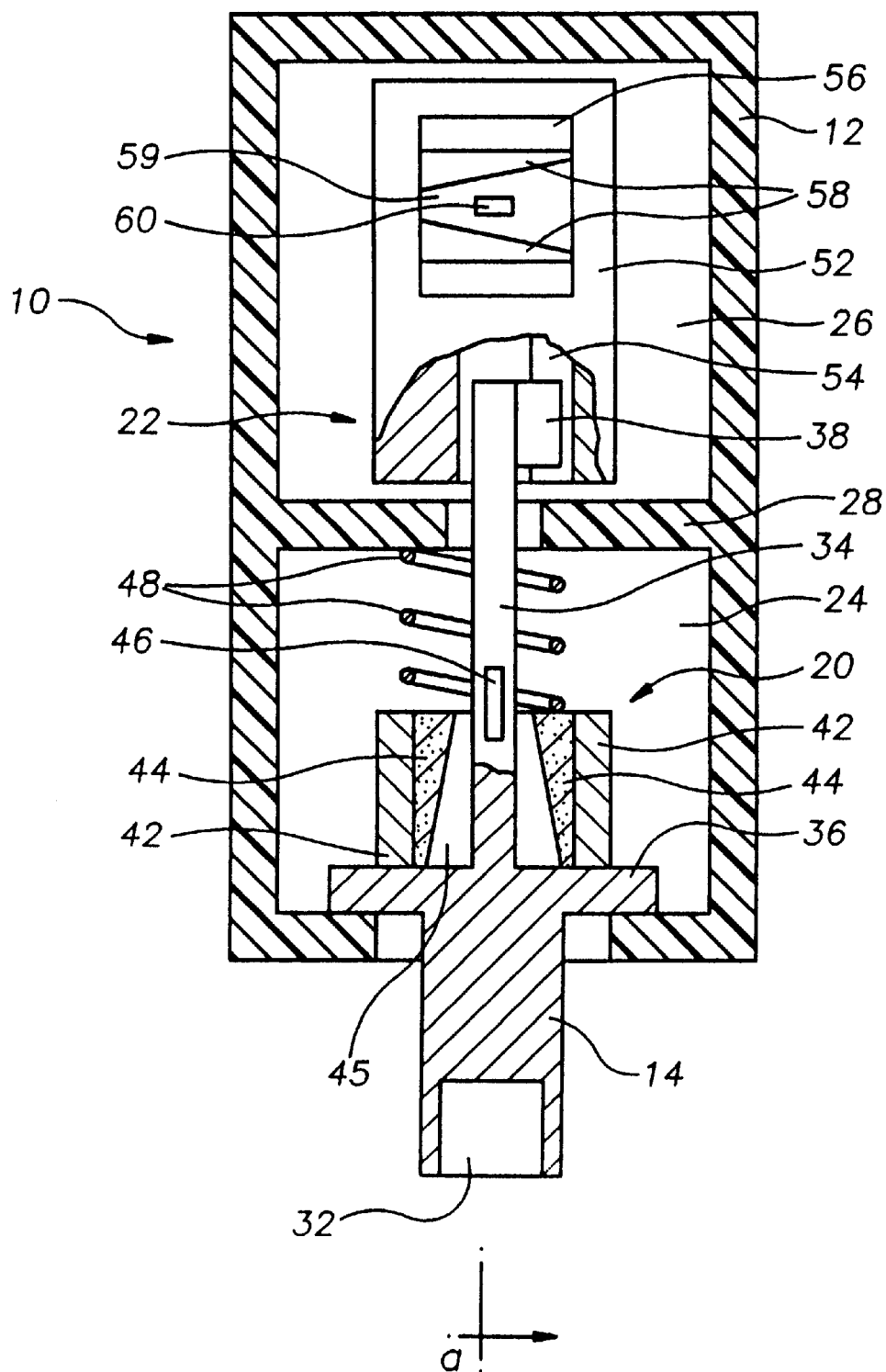
FIG. 1 is a cross sectional view of an embodiment of the invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail by the accompanying drawings. In the drawings like numbering represents like elements between the drawings.

BEST MODE FOR CARRYING OUT THE PREFERRED EMBODIMENT

Figure 2:
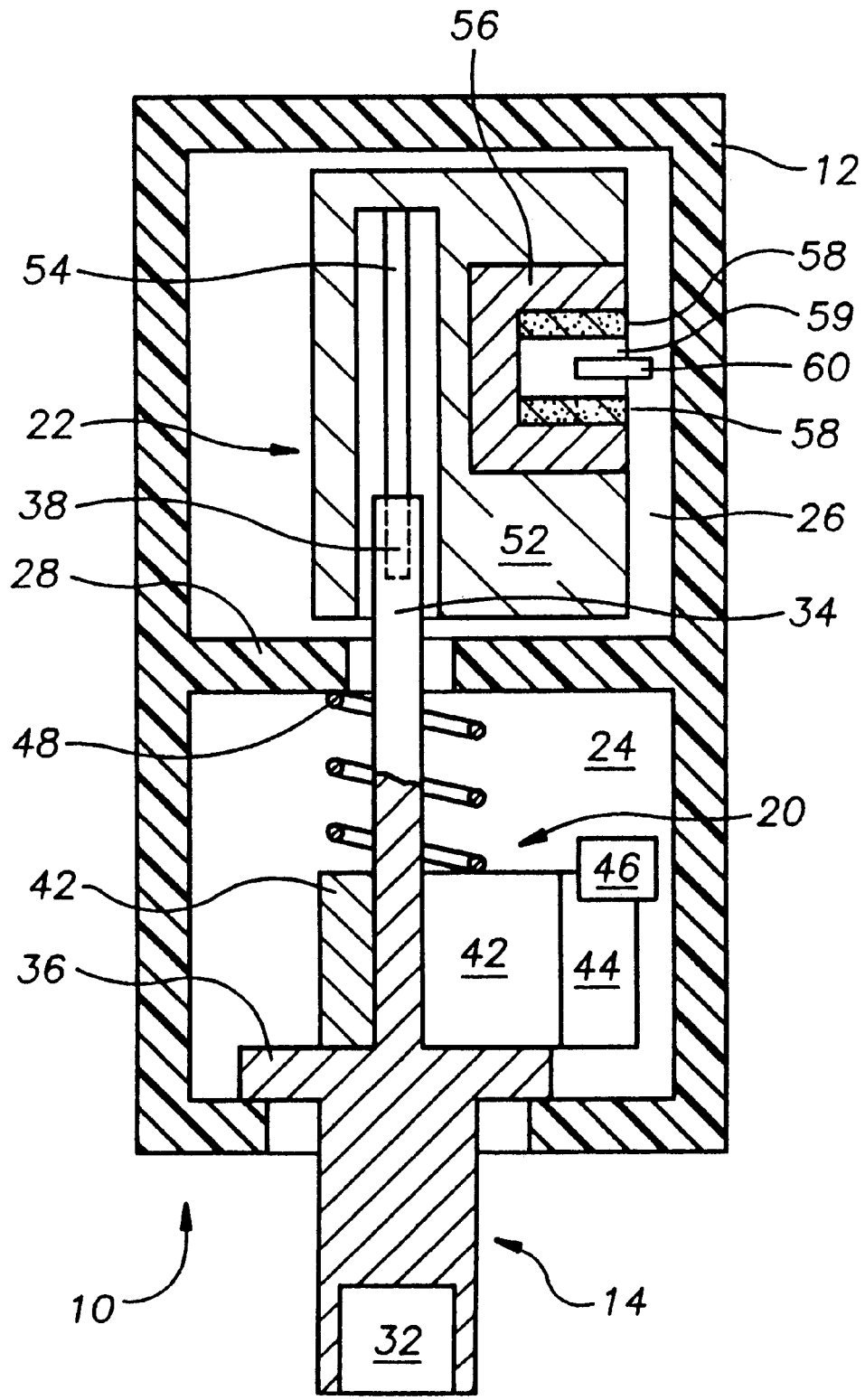
FIG. 2 is a cross sectional view of FIG. 1 taken along line a—a.

The present invention provides a position hall effect sensor for determining both rotational and linear position changes. Regarding FIG. 1 and FIG. 2, there is a dual positional sensor 10 having an outer housing 12, an actuator 14, a linear movement sensor 20, and a rotational movement sensor device 22. The housing 12 includes a lower chamber 24 and an upper chamber 26, with a barrier wall 28 separating therebetween. The actuator 14 is made up of a coupling 32 for coupling to a movable device or shaft (not shown) that is to have its position sensed, a rod 34 that extends from the lower to the upper chamber, a collar 36 for retaining the actuator 14 within the lower chamber, and a key 38. The linear movement sensor 20 is unattachably positioned to set on collar 36, and includes a magnetically conducting pole piece 42, a left and right magnet 44 that are separated by an air gap 45. The magnets and pole piece are positioned around the rod 34 in a "U" shaped configuration or form. The lower chamber 24 also includes a positionally fixed hall effect sensor 46 and a spring 48 positioned between the barrier wall 28 and the collar 36. The rotational hall effect sensor 22, located in the upper chamber 26, includes a sensor housing structure 52 that has a groove or slide 54 for insertion and sliding of the key 38. The sensor 22 further includes a magnetically conducting pole piece 56 and a top and bottom magnet 58 separated by an air gap 59. A hall sensor 60 is positioned between the two parts of the magnet 58 and fixed in position relative to any rotational movement of the rotational sensor 22.

In operation, the dual hall effect positional sensor 10 will sense both the rotational and axial positions of a body (not shown) coupled to the actuator. In particular, when the body is moved in a direction along the axis of the rod 34, the sensor 20 will determine the exact position of the body, key 38 will slide along groove 54 and not move the rotational positional sensor 22. When the body returns to its original position, the spring 48 will bias the sensor 20 back toward the collar 36. When the body is rotated around the axis of rod 34, key 38 will be forced against one side of groove 54 and thereby rotatably move the sensor 22, thus allowing the rotational position to be determined. During the rotational movement of the body, rod 34 will rotate without causing movement of linear sensor 20.

Figure 3:
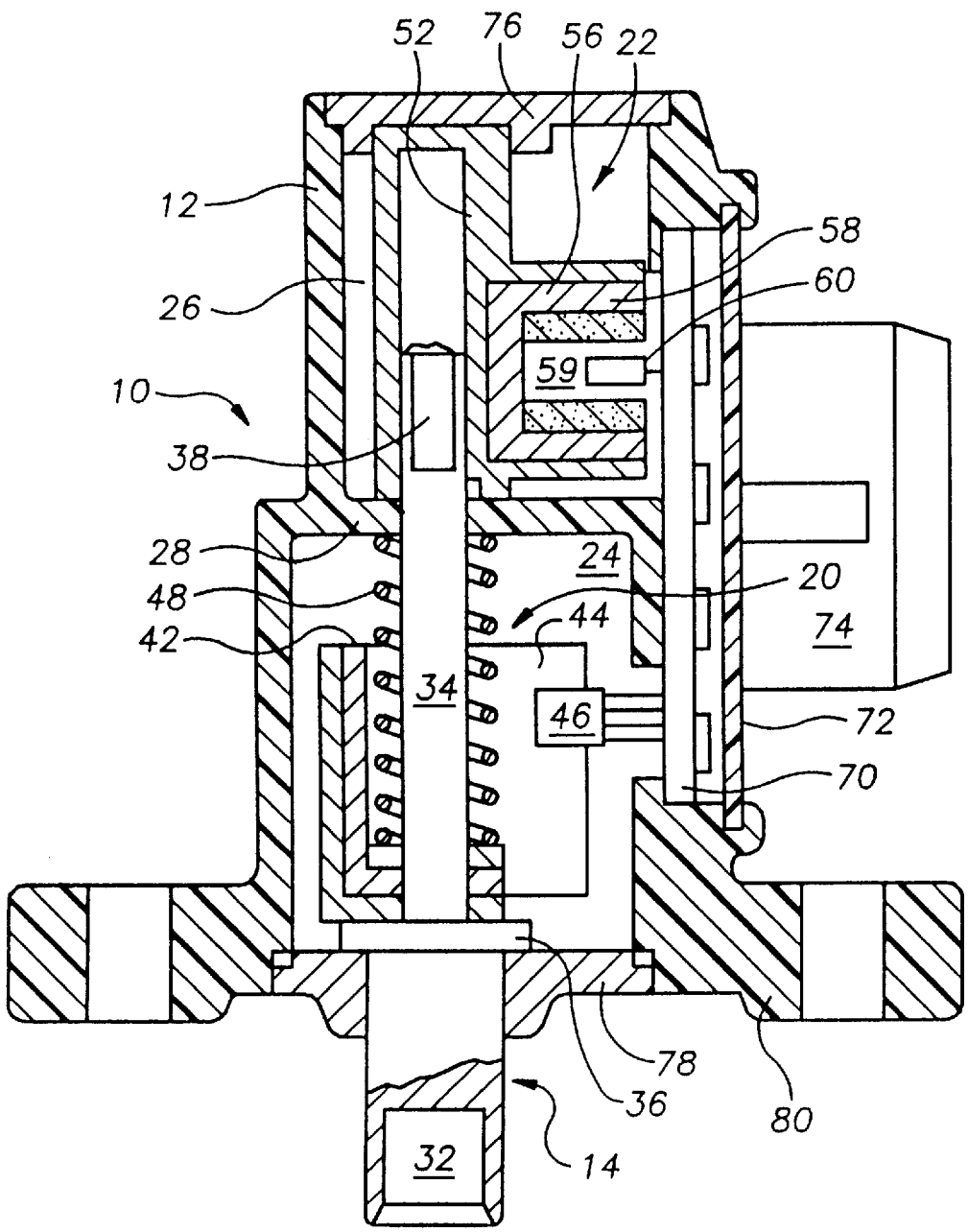
FIG. 3 is an isometric view of the preferred embodiment.

Referring to FIG. 3, there is an isometric view of the preferred embodiment. This mechanical design of this sensor 10 allows for the monitoring of both axial (linear) and rotational travel of the shaft or actuator 14. The sensor 10 is coupled to the movable body or shaft (not shown), as the body

INDUSTRIAL APPLICABILITY OF THE PREFERRED EMBODIMENT

Referring to FIG. 3, there is a sectional view of an application of the preferred embodiment. In addition to the previously discussed elements of the drawing, the sensor 10 includes substrate 70 with components mounted thereon, a cover 72, a connector housing for locating electrical connectors to be coupled to electrical cables for routing signal, a rear cover 76, a front cover 78, and a mounting 80 in the form of housing with bolt holes therethrough.

Figure 4:
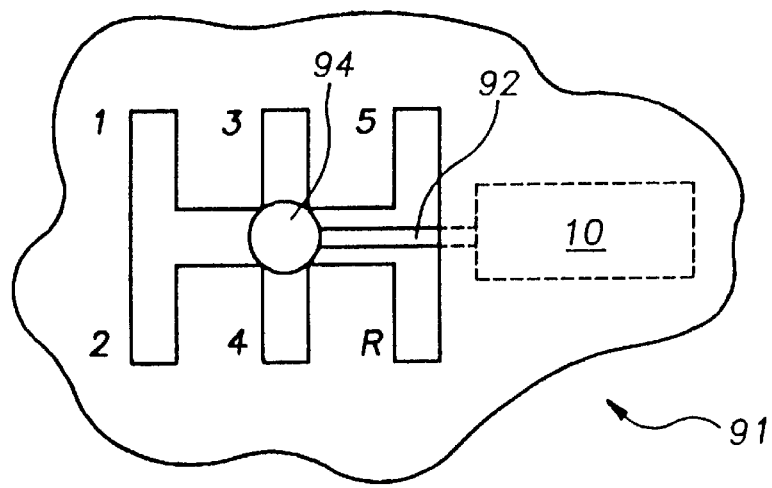
FIG. 4 is a sectional top view of a vehicles gear shifting control tower using an embodiment of the invention.

In reference to FIG. 4, there is illustrated a potential application for the sensor 10 as a selected shift manual control system 91 for shifting gears in a vehicle. The selected shift manual control system typically consists of an auto-clutch sub-system (not shown) and a shift-by-wire subsystem (not shown). The shift-by-wire subsystem controls the movement of the shift tower gate mechanism to change gears and ranges. The sensor 10, illustrated in FIG. 3, measures the position of the shift tower gate mechanism 94 and provides a signal to the controller (not shown) for closed loop feedback control. In particular, the sensor 10 can be coupled to the shaft 92 of a shift tower mechanism 94 used for shifting the gears of a vehicle, illustrated as positions 1, 2, 3, 4, 5, and R for reverse. As the shaft 92 of the shift tower mechanism 94 extends (to the right), the X-Y axial drive shaft (actuator 14) of the sensor 10 is depressed (against the spring 48). Attached to the sensor drive shaft (rod 34) are two magnet/pole piece assemblies (20 and 22). Two hall effect elements (46 and 60) pick-up two magnetic fields (across air gaps 45 and 59), one varied for the X-axis (hall effect sensor 46), the other for the Y-axis (hall effect sensor 60). As the drive shaft 92 extends (to the right), the magnetic field (Bx) increases across the hall device 20 sensing X-axis travel. This increase in field causes an increasing linear voltage across the hall device 46. This hall device voltage signal is then amplified to provide a measurable signal to the control module for the X-axis monitoring position.

For example, in operation, when shifting from a top located gear like 1, 3, or 5, to a lower positioned gear like neutral, 2, 4, or reverse, the shaft 92 of the shift tower mechanism 94 rotates and causes the X-Y axial drive shaft (actuator 14) to rotate. As the sensor shaft (actuator 14) rotates, the magnet 58 and pole piece 56 assembly also rotates. This is due to its unique key-way (key 38), that allows rotational travel (of the rotational sensor 22), but not axial or linear travel. This mechanical action causes the magnetic field (By), produced by the magnet 58 (formed across the air gap 59), to increase across the hall device 60 sensing the Y-axis travel (of the shift tower shaft). This increase in field produces an increasing linear voltage across the hall device 60. The hall device voltage is then amplified to provide a measurable signal to the control module (not shown) for the Y-axis monitoring position.

Figure 5:
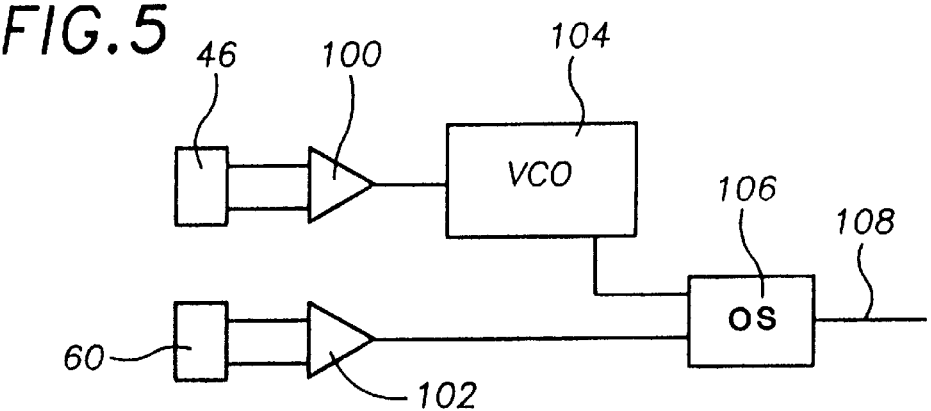
FIG. 5 is an electrical schematic of one method for generating a single output signal indicative of the position of the stick shift of FIG. 4.
Figure 6:
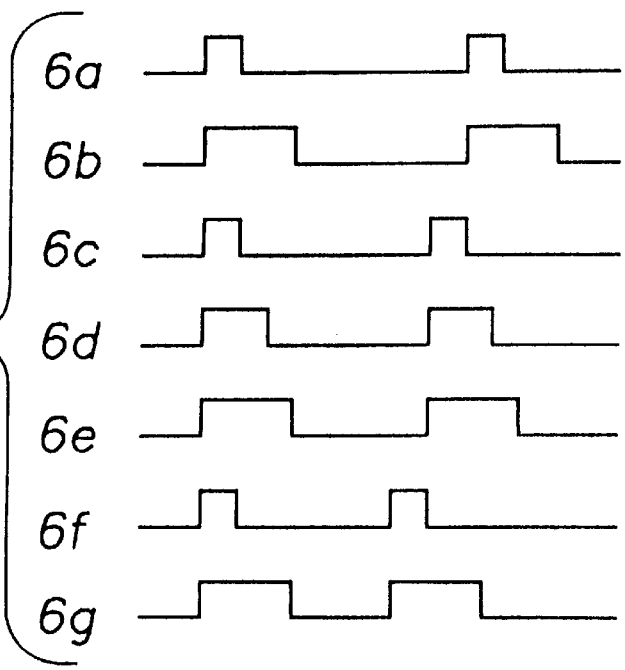
FIG. 6 illustrates several signal output diagrams indicative of the position of the stick shift of FIG. 4 utilizing the circuitry illustrated in FIG. 5.

Referring to FIG. 5, there is illustrated one circuit for generating a two-axis sensor encoding two positions on a single output 108. The two hall effect elements (46 and 60) pick up two magnetic fields (across air gaps 45 and 59), one varies for x-axis, the other for y-axis. The amplifiers 100 and 102 convert the signal from the hall effect elements 46 and 60 to single ended linear voltages. One linear voltage drives a voltage-to- frequency converter, VCO 104 for example. Increasing flux field (x-position changes) causes increasing linear voltage, which causes higher frequency. The frequency output triggers a one-shot pulse circuit 106. The one-shot circuit 106 has linear voltage input corresponding to y-axis (could be angular position). Maximum pulse width is set to be less than inverse of maximum frequency, pulse output can be 0 v to 5 v, or also open collector(or MOSFET drain) which allows load in module to pull up to arbitrary voltage, per customer specification. ICs 555 timer (for the one-shot 106) and ICs 566 for the VCO 104 are off-the-shelf parts. Amps 100 and 102 could be custom IC or op-amp circuits.

Referring to FIG. 6a–g, there are illustrated different outputs signals from the circuitry illustrated in FIG. 5. It is noted that the pulse frequency conveys the x-axis position, while the pulse width conveys the y-axis position. Specifically, in 6a, a low frequency short pulse width could indicate that the shift tower mechanism 94 is in first gear. Additionally, in 6b, a low frequency long pulse width could indicate that second gear is being activated. Likewise, 6c illustrates third gear, 6e illustrates fourth gear, 6f illustrates fifth gear, and 6g illustrates reverse. It is noted that 6d illustrates one possible signal for neutral, where the signal is always a pulse width that is between the short and long widths, but the frequency could vary as to the location that neutral is activated; for example, shorter frequencies are seen when neutral is activated from the fifth and reverse gears.

One of ordinary skill in the art of designing and using hall effect position detecting sensors will realize many advantages from using the preferred embodiment. For example, it is possible to mount the preferred embodiment onto an aircraft's flight stick to electronically determine both the rotational and linear movement of the flight control. Additionally, it is well understood that the sensors are electrically coupled to appropriate circuitry for analyzing the positional signals generated therefrom.

Although the illustrated embodiments discuss the arrangement of the two sensors relative to each other one skilled in the art will realize that the preferred embodiment would work with most any arrangement. For example, the two sensors could be positionally switched. Additionally, although the preferred embodiment discusses the use of two magnets and one pole piece arranged sensor with the hall effect sensor positioned therebetween, a skilled artisan could probably use most any known hall effect based sensor design. It is contemplated to design the key and groove differently and still be within the scope of the invention. For example, it is equally likely that the key would be on the housing and the groove would be in the rod 34, or that there would be no key or groove but another way of slidably attaching the rod 34 to the rotational sensor 22.

While the invention has been taught with specific reference to these embodiments, someone skilled in the art will recognize that changes can be made in form and detail without departing from the spirit and the scope of the invention. The scope of the invention is, therefore, indicated by the appended claims rather than by the description. All changes that come within the meaning and range of equivalency of the claims are to be embraced within their scope.

What is claimed and desired to be secured by patent is:

1. A sensor for determining both a rotational and linear position of a movable body, comprising:
   a) a housing being fixed in position against relative movement of the body;
   b) an actuator positioned in the housing and coupled to the movable body for receiving reciprocating motion;
   c) a linear magnetic field generator, positioned within the housing and coupled to the actuator, for generating a first variable magnetic field as the body moves linearly, the linear magnetic field generator having a first magnet and a first pole piece;
   d) a rotational magnetic field generator, positioned within the housing and coupled to the actuator, for generating a second variable magnetic field as the body moves rotationally, the rotational magnetic field generator having a second magnet and a second pole piece; and
   e) a first and a second magnetic field sensor affixed to the housing, the first magnetic field sensor positioned in the first variable magnetic field and the second magnetic field sensor positioned in the second magnetic field, the first magnetic field sensor generating a voltage that corresponds to the linear position of the body and the second magnetic field sensor generating a voltage that corresponds to the rotational position of the body.

2. The sensor according to claim 1, wherein the rotational magnetic field generator has a groove therein, and the actuator has a key mounted thereon for sliding along and within the groove during linear movement of the actuator without causing the rotational magnetic field generator to rotationally move.

3. The sensor according to claim 2, further comprising bias means, engaged to the housing for biasing the actuator toward a neutral position.

4. The sensor according to claim 1, wherein the first pole piece is U-shaped and the first magnet is attached to the first pole piece forming a first air gap.

5. The sensor according to claim 4, wherein the second pole piece is U-shaped and the second magnet is attached to the second pole piece forming a second air gap.

6. The sensor according to claim 4, wherein the first magnetic field sensor is located in the first air gap.

7. The sensor according to claim 6, wherein the second magnetic field sensor is located in the second air gap.

* * * * *